(12) United States Patent
Jin et al.

(10) Patent No.: US 9,942,581 B2
(45) Date of Patent: Apr. 10, 2018

(54) CONTENT-ADAPTIVE DIGITAL CONTENT ADJUSTMENT METHOD AND SYSTEM

(71) Applicant: YAHOO! INC., Sunnyvale, CA (US)

(72) Inventors: Haojian Jin, Santa Clara, CA (US);
Zheng Wen, Mountain View, CA (US);
Yale Song, New York, NY (US)

(73) Assignee: OATH INC., New York, NY (US)

( * ) Notice: Subject to any disclaimer, the term of this patent is extended or adjusted under 35 U.S.C. 154(b) by 290 days.

(21) Appl. No.: 14/985,692

(22) Filed: Dec. 31, 2015

(65) Prior Publication Data

US 2017/0195700 A1    Jul. 6, 2017

(51) Int. Cl.
| | |
|---|---|
| H04N 21/2343 | (2011.01) |
| H04N 21/454 | (2011.01) |
| H04N 21/4402 | (2011.01) |
| H04N 21/44 | (2011.01) |
| H04N 21/439 | (2011.01) |
| H04N 21/234 | (2011.01) |
| H04N 21/233 | (2011.01) |
| H04N 21/845 | (2011.01) |

(52) U.S. Cl.
CPC ... *H04N 21/234381* (2013.01); *H04N 21/233* (2013.01); *H04N 21/23418* (2013.01); *H04N 21/234345* (2013.01); *H04N 21/4394* (2013.01); *H04N 21/44008* (2013.01); *H04N 21/440281* (2013.01); *H04N 21/4542* (2013.01); *H04N 21/8456* (2013.01)

(58) Field of Classification Search
CPC ............. H04N 21/233; H04N 21/4394; H04N 21/44008; H04N 21/4307; H04N 21/47205
See application file for complete search history.

(56) References Cited

U.S. PATENT DOCUMENTS

| | | | |
|---|---|---|---|
| 9,451,328 B1 * | 9/2016 | Grove | H04N 21/4325 |
| 2003/0165325 A1 * | 9/2003 | Blair | G10L 21/04 386/344 |
| 2008/0235741 A1 * | 9/2008 | Ljolje | H04N 5/4401 725/89 |
| 2016/0217829 A1 * | 7/2016 | Bloch | G11B 27/11 |
| 2016/0342295 A1 * | 11/2016 | Jehan | G06F 3/0484 |
| 2017/0004858 A1 * | 1/2017 | Ngiam | G11B 27/005 |
| 2017/0142458 A1 * | 5/2017 | Watanabe | H04N 21/252 |
| 2017/0195741 A1 * | 7/2017 | Ljolje | H04N 21/6373 |

* cited by examiner

*Primary Examiner* — Brian T Pendleton
*Assistant Examiner* — Krista A Contino Saumby
(74) *Attorney, Agent, or Firm* — James J. DeCarlo; Greenberg Traurig, LLP

(57) ABSTRACT

Disclosed herein is a content-adaptive digital media content adjustment system, method and architecture. Playback rate of a media content item comprising audio and video content can be increased by removing a portion of the content item's audio content and a corresponding portion of the content item's video content. An increased playback rate of a multimedia content item is accomplished by decreasing the length of the multimedia content item by removing portions of the multimedia content item's audio and video content.

24 Claims, 10 Drawing Sheets

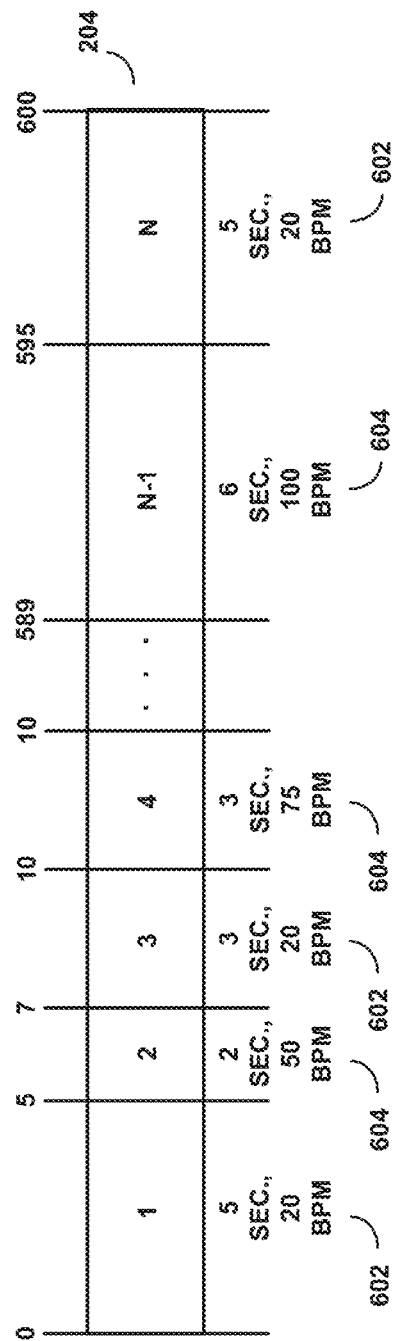

CONTENT-ADAPTIVE DIGITAL CONTENT ADJUSTMENT METHOD AND SYSTEM

FIELD OF THE DISCLOSURE

The present disclosure relates to digital content item adjustment, and more particularly to determining playback adjustments for a digital content item using its contents.

BACKGROUND

An application, such as a media player, can be used to play a digital content item. The web has made a vast amount of media content available to a user using a computer and a media player, such as a media player embedded in a browser application.

SUMMARY

While media content can be played at an accelerated speed, the quality of the media content is often time diminished. By way of one non-limiting example, playing media content at double its normal speed reduces playtime in half. There are problems associated with using a faster playback rate. For example, increasing the playback rate of audio results in audio distortion, such as a higher sounding pitch, e.g., increasing the pitch by an octave causes a human's voice to sound cartoon-like.

The present disclosure seeks to address these and other failings in the art and to provide a content-adaptive adjustment to adjust playback of a content item without unwanted side-effects, such as and without limitation audio distortion. The need for such capability is widespread and of ever increasing importance as the availability and use of digital content is continually increasing. Embodiments of the present disclosure improve technology via, at least, by processing digital data for transmission, playback, storage, etc., by adjusting, e.g., shortening, a digital content item, among other features and functions disclosed herein, thus speeding the process and/or making it more efficient, thus improving processing and response times and increasing the ability of a user to consume media in less time, or to consume more media in a given time period.

In accordance with one or more embodiments, a method is provided, the method comprising modifying, by a computing device, a content item's play length by removing an amount of the content item's audio content and video content, the modifying comprising identifying a time allocation score for each of a plurality of audio segments in the audio content, each audio segment's time allocation score being inversely related to its tempo, each audio segment identified as a silent audio segment being assigned a given tempo and each audio segment identified as a non-silent audio segment being assigned a tempo using its audio content; determining a desired length for each audio segment of a number of audio segments selected from the plurality, the selected audio segments having a higher time allocation score relative to non-selected audio segments of the plurality, the determining comprising using a tempo increase amount in determining the desired length; and for each selected audio segment, removing some portion of the audio segment's content corresponding to a difference between the audio segment's original length and its desired length; identifying, for each identified audio segment, a corresponding video segment in the content item; and adjusting, for each adjusted audio segment, the corresponding content segment by removing a number of frames from the corresponding video segment until the adjusted length of the corresponding video segment matches the selected audio segment's desired length.

In accordance with one or more embodiments a system is provided, the system comprising at least one computing device, each computing device comprising a processor and a storage medium for tangibly storing thereon program logic for execution by the processor, the stored program logic comprising modifying logic executed by the processor for modifying a content item's play length by removing an amount of the content item's audio content and video content, the modifying logic executed by the processor comprising identifying logic executed by the processor for identifying a time allocation score for each of a plurality of audio segments in the audio content, each audio segment's time allocation score being inversely related to its tempo, each audio segment identified as a silent audio segment being assigned a given tempo and each audio segment identified as a non-silent audio segment being assigned a tempo using its audio content; determining logic executed by the processor for determining a desired length for each audio segment of a number of audio segments selected from the plurality, the selected audio segments having a higher time allocation score relative to non-selected audio segments of the plurality, the determining comprising using a tempo increase amount in determining the desired length; removing logic executed by the processor for removing, for each selected audio segment, some portion of the audio segment's content corresponding to a difference between the audio segment's original length and its desired length; identifying logic executed by the processor for identifying, for each identified audio segment, a corresponding video segment in the content item; and adjusting logic executed by the processor for adjusting, for each adjusted audio segment, the corresponding content segment by removing a number of frames from the corresponding video segment until the adjusted length of the corresponding video segment matches the selected audio segment's desired length.

In accordance with yet another aspect of the disclosure, a computer readable non-transitory storage medium is provided, the medium for tangibly storing thereon computer readable instructions that when executed cause a processor to modify a content item's play length by removing an amount of the content item's audio content and video content, the instructions to modify comprising instructions that when executed cause the processor to identify a time allocation score for each of a plurality of audio segments in the content item, each audio segment's time allocation score being inversely related to its tempo, each audio segment identified as a silent audio segment being assigned a given tempo and each audio segment identified as a non-silent audio segment being assigned a tempo using its audio content; determine an adjusted length for each audio segment of a number of audio segments selected from the plurality, the selected audio segments having a higher time allocation score relative to non-selected audio segments of the plurality, the determining comprising using a tempo increase amount in determining the adjusted length; remove, for each selected audio segment, some portion of the audio segment's content corresponding to a difference between the audio segment's original length and its adjusted length; modify the content item's video content to remove an amount of video content; identify, for each identified audio segment, a corresponding video segment in the content item; adjust, for each adjusted audio segment, the corresponding content segment by removing a number of frames from the corresponding video segment until the adjusted length of the corresponding video segment matches the selected audio segment's adjusted length.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of a process flow for use in accordance with one or more embodiments of the present disclosure.

FIG. 2 provides an example of an input content item comprising audio and video content in accordance with one or more embodiments of the present disclosure.

FIG. 3 provides an example of an output content item comprising audio and video content in accordance with one or more embodiments of the present disclosure.

FIG. 4, comprising FIGS. 4A and 4B, provide a process flow example for use in adjusting a media content item's audio content in accordance with one or more embodiments of the present disclosure.

FIG. 5 provides a process flow example for use in adjusting a media content item's video content in accordance with one or more embodiments of the present disclosure.

FIG. 6 provides an example of audio content segmented in accordance with one or more embodiments of the present disclosure.

FIG. 7 provides examples of unadjusted and adjusted values of audio segments determined in accordance with one or more embodiments of the present disclosure.

FIG. 8 provides an example of video content segmented in accordance with one or more embodiments of the present disclosure.

FIG. 9 provides some video content frame removal examples in accordance with one or more embodiments of the present disclosure.

DETAILED DESCRIPTION

Figure 1:
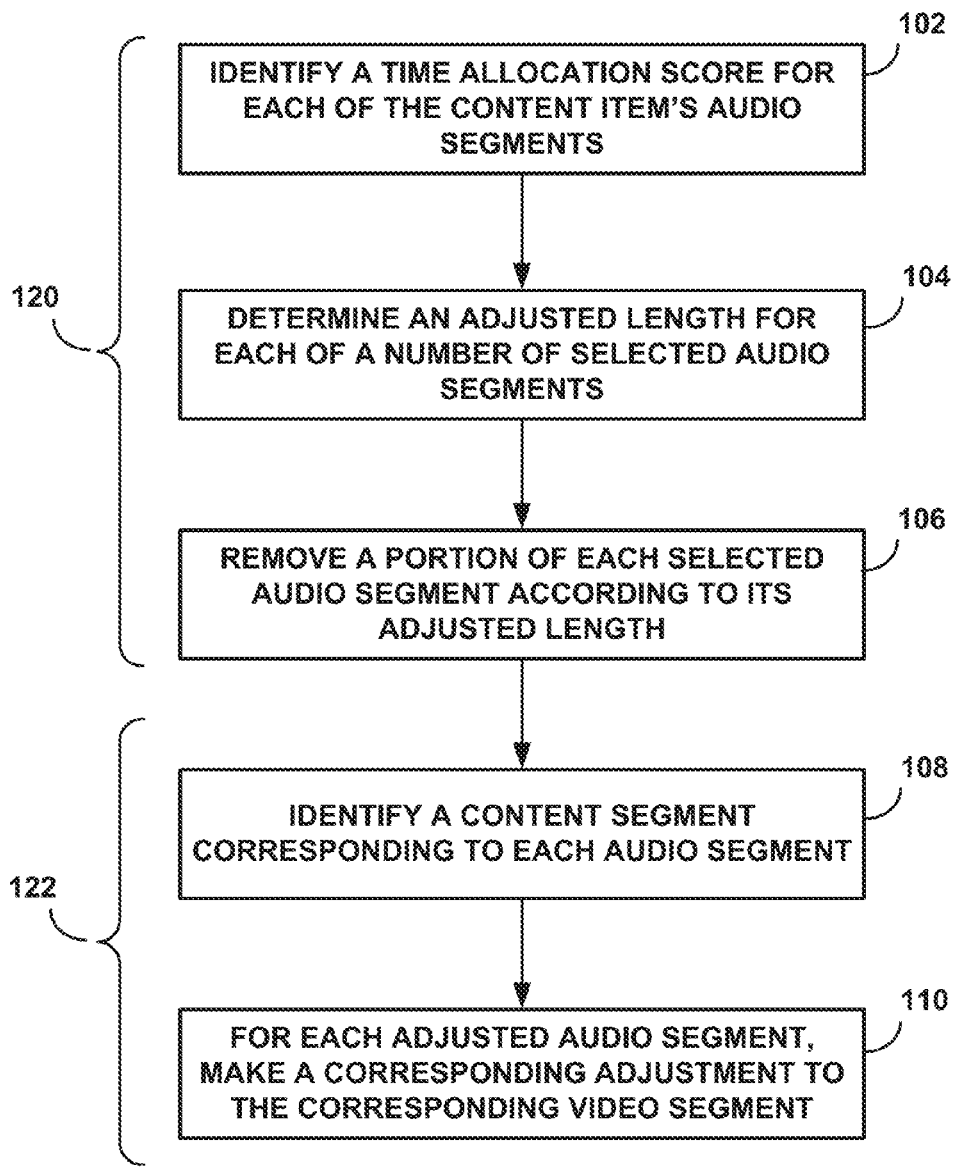

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a content-adaptive digital media content adjustment system, method and architecture. Embodiments of the present disclosure may be used to adjust playback of a multimedia content item comprising both audio and video content by removing a portion of the content item's audio content and a corresponding portion of the content item's video content. By selectively removing content to shorten the content item, its playback rate may be increased without introducing unpleasing side effects, such as and without limitation sound pitch increases and/or audio "choppiness" that result in audio distortions. In accordance with one or more embodiments, an increased playback rate of a multimedia content item can be accomplished by decreasing the length of the multimedia content item by removing portions of the multimedia content item's audio and video content. FIG. 1 provides an example of a process flow for use in accordance with one or more embodiments of the present disclosure.

Embodiments of the present disclosure reduce the multimedia content item in order to achieve an increased playback rate. This approach avoids distortions, e.g., audio and/or video playback distortions. By way of some non-limiting examples, a 2× playback rate can be achieved by strategically removing portions of the content item equal to half of the content item's length. A content item comprising both audio and video content is reduced by removing a portion of the audio and a corresponding portion of the video, e.g., removing half the audio and a corresponding half of the video to achieve a 2× playback rate.

A reduction amount can be identified based on a desired playback rate. As yet another example, a reduction amount might be expressed in another manner, such as and without limitation as a percentage or fraction to be reduced, such as and with limitation 50% or ½, both of which result in a content item being reduced to half the original length by removing half of the content.

In accordance with one or more embodiments, a content item has a playback length, or length, which can be expressed temporally. In accordance with one or more such embodiments, a measure of the amount of adjustment to a content item can be expressed temporally. By way of a non-limiting example, a content item's original playback length of 600 seconds can be reduced to a playback length of 360 seconds, which is approximately a 40% reduction in the original playback length.

In accordance with one or more embodiments, a content item comprising both audio and video content is modified by removing a portion from both the content item's audio content and the content item's video content, as illustrated in process flow sections 120 and 122. The amount of audio and video content removed can be based on a desired playback length, or a desired playback rate. In accordance with one or more such embodiments, a multimedia content item can be shortened by shortening its audio content and shortening its video content.

In accordance with one or more embodiments, the content item's audio content is modified by removing an amount, e.g., a number of segments, of the audio content. The audio content comprises a plurality of audio segments, each of which is identified as either a silent audio segment or a non-silent audio segment. Each audio segment has a tempo, which may be expressed in beats per second, or bps, or other temporal unit, such as and without limitation beats per minute, or bpm. At step 102, each audio segment is assigned a time allocation score which is inversely related to its tempo, such that the faster the tempo the smaller the time allocation score. A non-silent audio segment's tempo can be determined based on the audio content. An audio segment that is identified as a silent audio segment can be assigned a given tempo, which can be any value, which might be dynamically set, predefined, a default value, etc.

In accordance with one or more embodiments, the tempo assigned to a silent audio segment can be slower in comparison to the non-silent audio segment(s) tempo(s). In so doing, the silent audio segment(s) can be differentiated from the non-silent audio segment(s) by tempo and by time allocation score, which is inversely related to tempo. By way of some non-limiting examples, a silent audio segment with a slower tempo than a non-silent tempo has a higher time allocation score than the non-silent audio segment.

At step 104, a number of the audio segments of a content item that are to be adjusted can be selected based on corresponding time allocation scores. By way of a non-limiting example, the selected audio segments are those with the highest or higher time allocation scores relative to the time allocation scores of non-selected audio segments. An adjusted temporal length is determined for each of the selected audio segments using an increased tempo for each selected audio segment. To illustrate without limitation, a five second audio segment with a 20 bps tempo can be cut to 1 second by increasing its tempo to 100 bps, or 5 seconds multiplied by (20/100) is equal to 1 second, which reduces the temporal length of the audio segment from 5 seconds to 1 second. By way of further non-limiting illustration, a temporal length adjustment can be generally expressed as follows:

$$\text{Old Length} * (\text{Old Tempo}/\text{New Tempo}) = \text{New Length}, \quad \text{Expr. (1)}$$

where the old temporal length of the audio segment is multiplied by a factor, e.g., a fraction, determined using a ratio of the old and new tempos assigned to the audio segment.

At step 106, each of the selected audio segments is modified by removing a portion of the audio segment, the portion that is removed can comprise a number of sub-segments of the audio segment which collectively have a temporal length corresponding to the difference between the audio segment's old and new temporal lengths. By way of a non-limiting example, the sub-segments that are removed might correspond to gaps between words or other insignificant or perceptually insignificant portions of the audio segment. In so doing, an audio segment's content can be modified, e.g., reduced in temporal length, without modifying other characteristics, such as pitch, of the audio content. By way of a non-limiting example, a synchronized overlap-add method (SOLA) can be used to shorten an audio segment's content by removing some of the content.

Embodiments of the present disclosure modify each video content segment corresponding to an audio segment with an adjusted length. At step 108, for each audio segment identified, a corresponding video content segment can be identified, e.g., using the audio segment's start and end times. The corresponding content segment has a corresponding temporal length. At step 110, for each adjusted audio segment, the corresponding content segment's length is adjusted by an amount corresponding to the amount of the adjusted audio segment's length adjustment. In accordance with one or more embodiments, a number of frames are removed from the corresponding content segment to adjust the content segment's length. By way of a non-limiting example, assuming that an audio segment is adjusted to remove three seconds of the audio segment's content and the content item's frame rate is 25 frames per second (fps), 75 frames can be removed from the corresponding content segment to adjust the corresponding content segment's length an amount corresponding to the length adjustment made to the audio segment. In accordance with one or more embodiments, the frames that are removed are preferably frames considered to be insignificant or perceptually insignificant, which can be relative to other frames in the video content.

Figure 2:
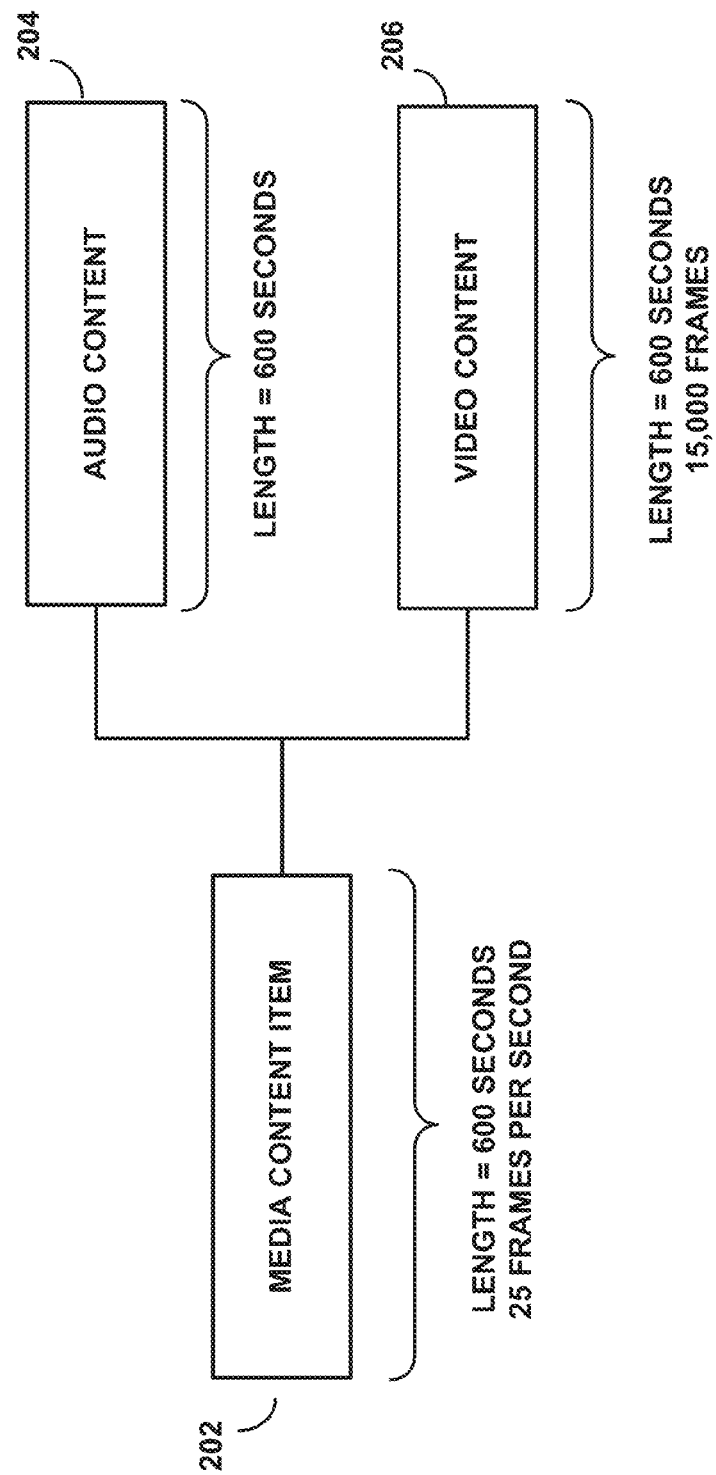

FIG. 2 provides an example of a content item comprising audio and video content for use in accordance with one or more embodiments of the present disclosure. In the example shown in FIG. 2, the content item 202 is a multimedia content item comprising both audio content 204 and video content 206. In the example, media content item 202 has a temporal length of 600 seconds and a frame rate of 25 frames per second (fps). Embodiments of the present disclosure operate on the audio content 204 separate from the video content 206, both of which have a length of 600 seconds. In accordance with at least one embodiment of the present disclosure, one or more software libraries and/or programs may be used to determine the temporal length and frame rate of the multimedia content item 202. By way of a non-limiting example, FFmpeg™, which is a software library available at www.ffmpeg.org, provides a programming interface comprising a number of programs, which can be used to extract information, e.g., temporal length and frame rate, etc., from the media content item 202, and separate the audio content 204 and the video content 206 of the media content item 202.

In the example shown in FIG. 2, the audio content 204 and the video content 206 have the same temporal length; however, embodiments of the present disclosure can be used with audio and video content having differing lengths. In the example shown in FIG. 2, the video content 206 comprises 15,000 frames, which can be determined by multiplying the length and frame rate, e.g., 600 seconds*25 fps=15,000 frames.

Figure 3:
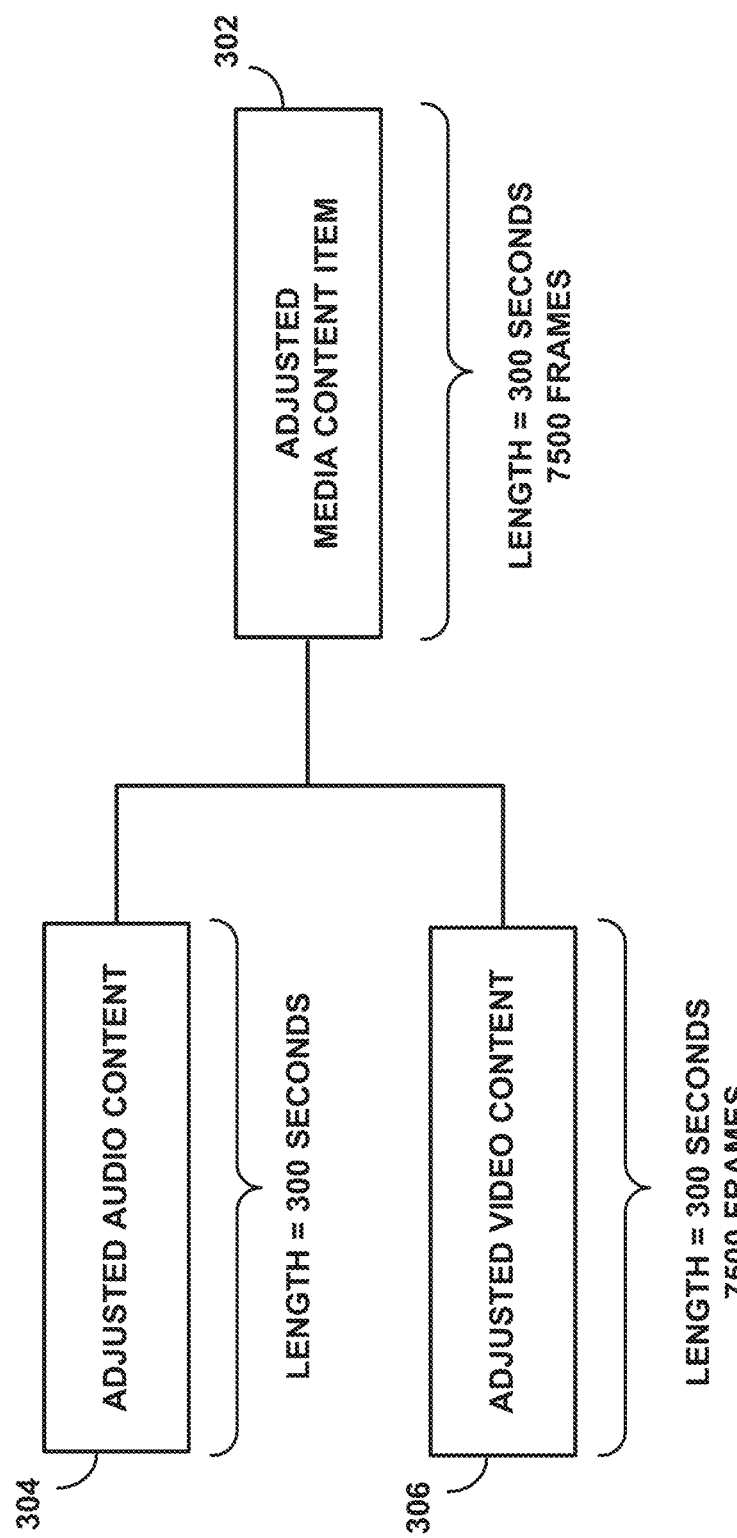

FIG. 3 provides an example of an output content item comprising audio and video content in accordance with one or more embodiments of the present disclosure. In the examples shown in FIGS. 2 and 3, the temporal length of the audio content 204 is adjusted by removing some, e.g., a perceptually insignificant portion, of the content from audio content 204 to yield adjusted audio content 304, the temporal length of the video content 206 is adjusted by removing a number of frames, e.g., perceptually insignificant frames, from the video content 206 to yield adjusted video content 306, and the adjusted audio content 304 and the adjusted video content 306 are used to generate adjusted media content item 302. By way of a non-limiting example, a software library, such as and without limitation FFmpeg™, may be used to combine the adjusted audio content 304 and the adjusted video content 306 to yield the adjusted media content item 302.

The amount of the adjustment can be determined using input, e.g., adjustment input, indicating a desired playback rate, such as and without limitation 1.5×, 2×, 3×, etc., adjustment input indicating an amount of time to remove, adjustment input indicating a desired adjusted length, etc. By way of a non-limiting example, the adjustment input might be user input received via an interface of a media player. Embodiments of the present disclosure may be implemented offline or online. By way of some non-limiting examples, an online video platform might be an online video hosting platform, or service, such as and without limitation Flickr™, Youku™, YouTube™, Facebook™, Hulu™, Vimeo™, etc. A video hosting service, or other service, may be provided by one or more server computing devices. Embodiments of the present disclosure may be implemented on a client computing device or a server computing device.

By way of a further non-limiting example, an online service, such as a video hosting service, can transmit content, e.g., such as and without limitation media content item 202, adjusted media content item 302 for playback by a media player application embedded in the service's web page and/or any media player executing at a client, or other, computing device. A media player application can include a number of playback controls, including a control to change the rate at which a content item is played back, adjust a content item's playback length, etc. In an offline mode, different versions of a content item might be pre-generated for future playback.

By way of a non-limiting example, a video hosting service might pre-generate multiple versions of a content item, each of which has a different length to accommodate different playback rates. In response to an online user's request with associated adjustment input, a pre-generated version can be selected corresponding to the requested playback rate, or a new version might be generated in a case that there is no pre-generated version corresponding to the requested playback rate.

Embodiments of the present disclosure use the adjustment input to identify an amount of content to be removed from an input content item, e.g., media content item 202, and its component parts, e.g., audio content 204 and video content 206. In the example shown in FIGS. 2 and 3, the media content item 202 is to be halved in length, e.g., from 600 seconds to 300 seconds, which might be indicated by adjustment input indicating a 2× playback rate, a 50% length adjustment, a 300 second length, etc. In accordance with embodiments of the present disclosure, the audio content 204 is adjusted such that 300 seconds of the audio content is removed to yield the adjusted audio content 304, 7500 frames of the video content 206 are removed to yield the adjusted video content 306 and the adjusted audio content 304 is combined with the adjusted video content 306 to yield the adjusted media content item 302, which has a length of 300 seconds and comprises 7500 frames.

Figure 4A:
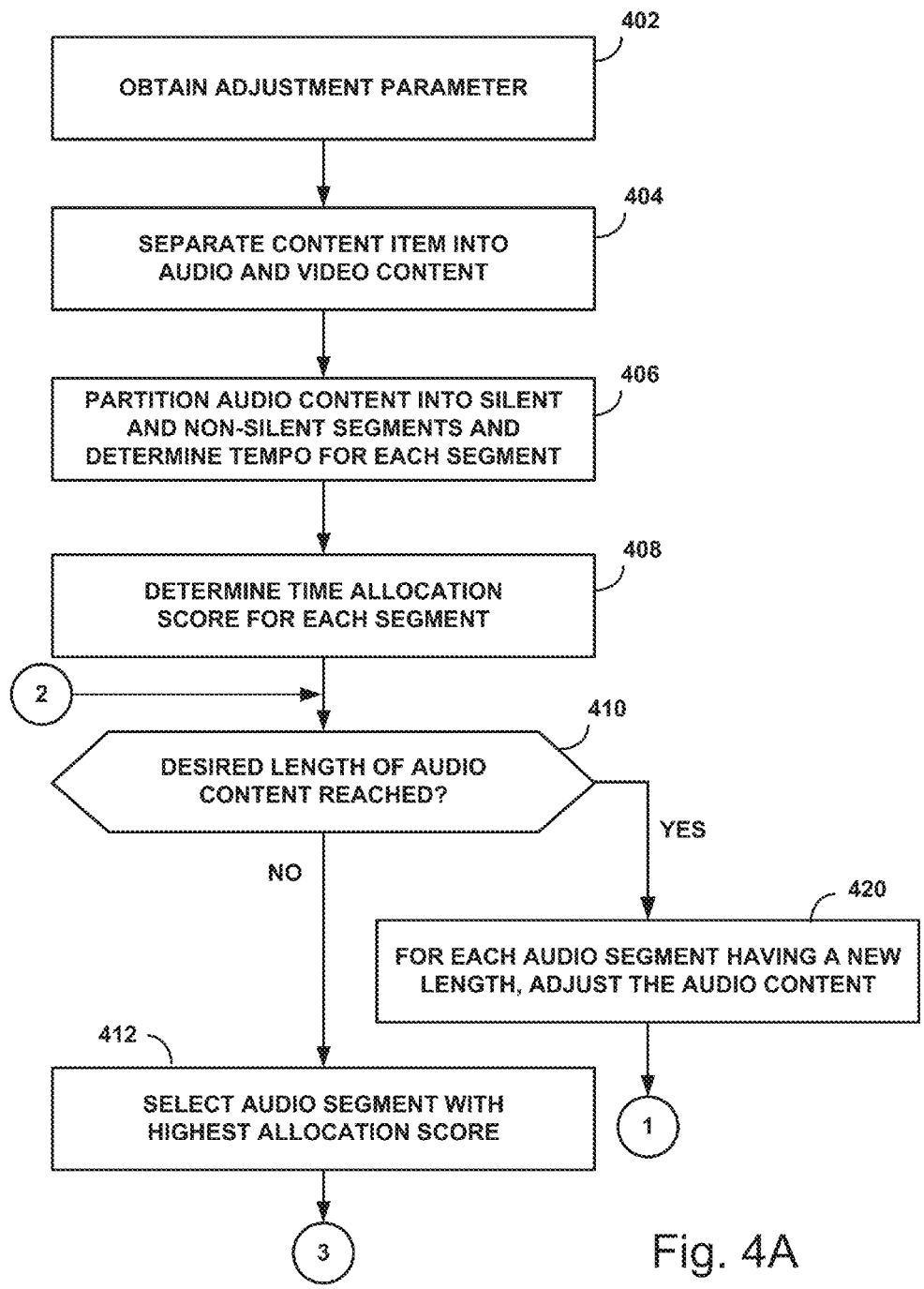
Figure 4B:
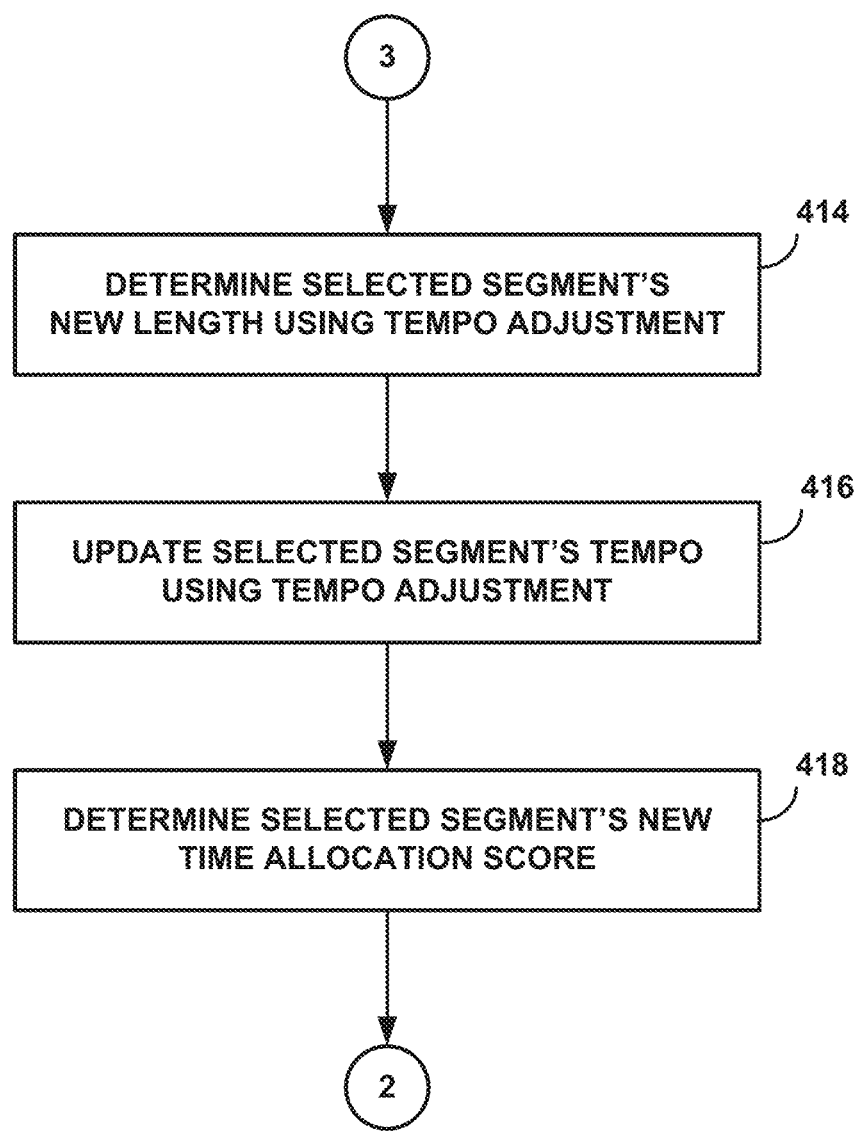
Figure 5:
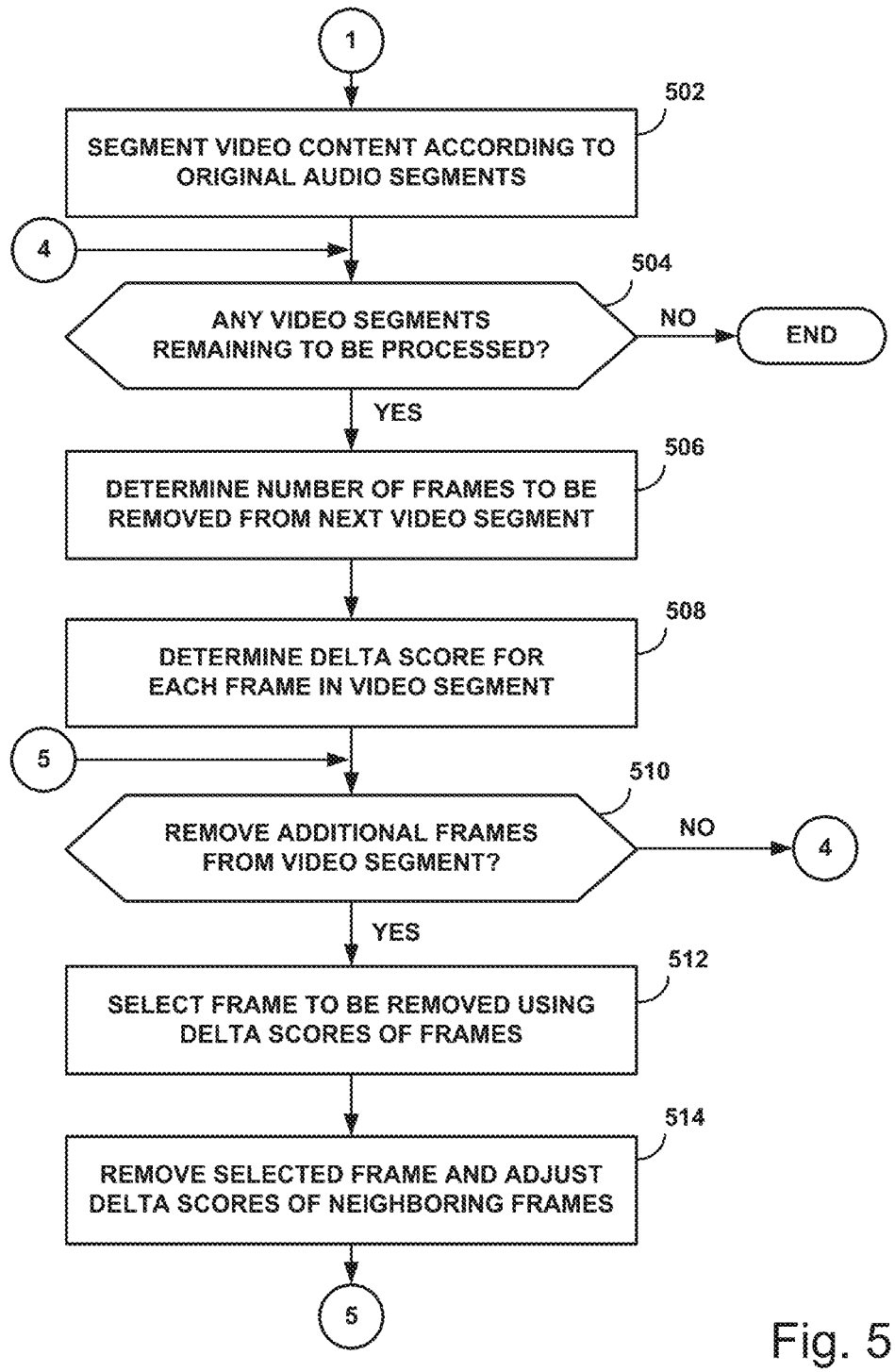

FIG. 4, comprising FIGS. 4A and 4B, provide a process flow example for use in adjusting a media content item's audio content in accordance with one or more embodiments of the present disclosure. FIG. 5 provides a process flow example for use in adjusting a media content item's video content in accordance with one or more embodiments of the present disclosure. In accordance with one or more embodiments, the audio content and video content are adjusted separately but in a synchronized manner, so that the adjusted length of the audio content matches the adjusted length of the video content, even in the case that the two are being adjusted separately.

With reference to FIG. 4A, at step 402, an adjustment parameter, or adjustment input, is obtained. Such input may identify a new playback rate, a new playback length, etc. At step 404, the content item is separated into audio content and video content. By way of a non-limiting example, the media content item 202 can be the input content item, which is separated into the audio content 204 and the video content 206 at step 404.

At step 406, the audio content 204 is partitioned into segments, each of which is identified as either a silent segment or a non-silent segment. In accordance with one or more embodiments, a silence detector may be used to identify the silent and non-silent segments of the audio content 204.

Any suitable technique for identifying and classifying segments of audio content as either silent or non-silent can be used. By way of a non-limiting example, a semi-supervised method such as that described in https://github.com/tyiannak/pyAudioAnalysis/wiki/5.—Segmentation can be used. By way of a further non-limiting example, a support vector machine (SVM) is trained, e.g., using both high energy and low energy segments as training data, to distinguish between high-energy and low-energy segments. The resulting SVM can be applied to the audio content 204 to detect the silent and non-silent segments. The SVM's output can identify at least an endpoint, e.g., a temporal endpoint, of each segment and a probability indicating whether the segment is a silent or non-silent segment. Each segment of the audio content 204 can be classified as either silent or non-silent using the SVM's output. The length of one segment can vary from the length of other segments. In accordance with one or more embodiments, a first segment is identified as either silent or non-silent and extends until the beginning of the next segment, which is determined to be different from the first, or preceding, segment's silent/non-silent type.

FIG. 6 provides an example of audio content segmented in accordance with one or more embodiments of the present disclosure. Segment 1, which has a length of 5 seconds, is the first segment in the audio content 204. Segment 1 is one of the silent segments 602 detected in the audio content 204. Segment 2 is the next segment of audio content 204 and has a length of 2 seconds. Segment 2 is considered a different segment from the 1 segment, since it is identified as one of the non-silent segments 604 of audio content 204 and the segment 1 is a silent segment 602.

At step 406, a tempo is identified for each identified audio segment. By way of a non-limiting example, tempo can be expressed as a number of beats per second (bps), which represents a speed or pace of an audio segment's audio content. By way of some non-limiting examples, 60 bps signifies 1 beat every second, 120 bps signifies 2 beats every second, which is a faster rate than 60 bps. In other words, the speed or pace increases as the number of beats per second, or other temporal unit measure, increases.

In the example shown in FIG. 6, the $2^{nd}$, $4^{th}$ and $n^{th}-1$ audio segments, which are each a non-silent segment 604, are each assigned a tempo value using its audio content, and the $1^{st}$, $3^{rd}$ and $n^{th}$ audio segments, which are each a silent segment 602, can be assigned a tempo used for non-silent segments. In the example shown in FIG. 6, the tempo of each silent segment 602 is set to a default value of 20 bps. Any suitable tool can be used to assign a tempo to a non-silent audio segment. A non-limiting example of a tool that can be used to assign a tempo to a non-silent audio segment is a software library available at SoundTouch.net.

At step 408, a time allocation score is assigned to each audio segment. In accordance with one or more embodiments, a time allocation score is inversely related to tempo, and can be determined using tempo and an optional constant, A, which may be varied based on one or more characteristics, such as and without limitation a quality characteristic of the media content item 202. By way of a non-limiting example, the optional constant, A, may be a small value for content that has a higher quality, to limit the amount of shrinking that is used for the content. In accordance with one or more embodiments, an audio segment's time allocation score can be determined using the following expression:

$$\text{U\_score} = \frac{A}{\text{Tempo}}, \qquad \text{Expr. (2)}$$

where U_score is the time allocation score and A is the optional constant.

At step 410, a determination is made whether a desired length of the audio content has been reached. By way of a non-limiting example, such a determination may be made by comparing the length of the adjusted audio content 304 with a desired length, the latter of which can be determined using the obtained adjustment parameter. By way of a further non-limiting example, where the adjustment parameter identifies a desired length, the length of the adjusted audio content 304 can be compared to the adjustment parameter at step 410. To further illustrate without limitation, in a case that the adjustment parameter is a percentage adjustment, such as 10%, 15%, 20%, 23%, 30%, 40%, 44%, 50%, 60%, etc., the length of the adjusted audio content 304 can be compared to the result of the length of the audio content 204 multiplied by the percentage adjustment.

If it is determined, at step 410, that the desired length of the audio content 304 has been reached, processing continues at step 420 to adjust the actual length of the segment's audio content so that the audio content's actual length, after removal of some of the audio content, has an actual length that is equal to the desired length, and processing continues at step 502 of FIG. 5 to adjust the video content 206 in accordance with the adjustment made to the audio content 204.

If it is determined, at step 410 that the desired length of the audio content 304 has not been reached, processing continues at step 412 to select an audio segment with the highest allocation score. In accordance with one or more embodiments, the tempo assigned to each of the silent segments 602 is set such that the associated time allocation score assigned to each of the silent segments 602 can be some of the highest time allocation scores assigned to segments of the audio content 204. The remaining audio segments can be ordered according to their time allocation scores, and the audio segment with the highest time allocation score can be selected at step 412.

Processing continues, at step 414 of FIG. 4B, to determine the selected segment's new length. In accordance with one or more embodiments, the selected segment's new length is determined by using an increased tempo for the selected segment, which in effect results in a decrease in the selected segment's length. At step 416, the selected audio segment's tempo is updated using a tempo adjustment. If the tempo adjustment results in an increase in tempo, the length of the audio segment is decreased. By way of a non-limiting example, increasing a 5 second silent segment's tempo from a tempo of 20 bpm to 100 bpm decreases its length from 5 seconds to 1 second. In other words and using expression (1), 1 sec.=5 sec.*(20/100), or 1 sec.=5 sec.*(1/5). Embodiments of the present disclosure use the new length to determine an amount of the audio segment that is to be removed from the audio segment in order to shorten the audio segment to the desired length.

At step 418, the selected audio segment's time allocation score is updated using the new tempo determined for the audio segment at step 416. Processing continues at step 410 to determine whether any additional adjustment is needed, e.g., a determination is made whether the desired length of the audio content has been reached.

FIG. 7 provides examples of unadjusted and adjusted values of audio segments determined in accordance with one or more embodiments of the present disclosure. In the example shown in FIG. 7, a value of 100 is used for the constant A, so that the U_score for each audio segment is determined, using expression (2), as: 100/Old Tempo. As such, the $1^{st}$, $3^{rd}$ and $n^{th}$ silent audio segments have the highest time allocation score, or U_score, which results in these audio segments being selected for adjustment before the other audio segment.

Based on their respective U_scores, the $2^{nd}$, $4^{th}$ and $n^{th}-1$ segments are selected, in order, after the $1^{st}$, $3^{rd}$ and $n^{th}$ segments. The same tempo, i.e., 100 bps, is used as the new tempo. A tempo other than 100 bps can be used as the new tempo, and a different tempo can be used for different audio segments. In the example shown in FIG. 7, the length of the $n^{th}-1$ audio segment is not decreased, since the old and new tempos are the same and there was no increase in tempo. The $1^{st}$, $2^{nd}$, $3^{rd}$, $4^{th}$, and $n^{th}$ audio segments are adjusted in length by removing an amount of the audio content in each one to reduce the temporal size of each audio segment.

Figure 8:
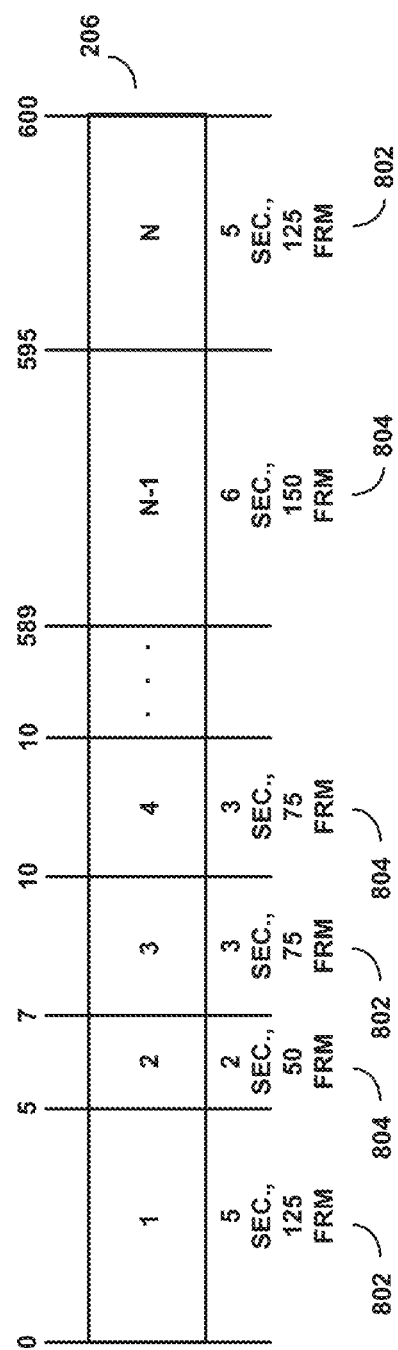

With reference to FIG. 5, at step 502, the video content 206 is segmented according to the segments 602 and 604 of the audio content 204. FIG. 8 provides an example of video content segmented in accordance with one or more embodiments of the present disclosure.

In the example shown in FIG. 8, video segments 1, 2, 3, 4, n−1 and n correspond to the audio segments 1, 2, 3, 4, n−1 and n shown in FIG. 6. For example, the $1^{st}$ video segment is 5 seconds in length, starts at time 0 seconds and ends at time 5 seconds, which corresponds to theist audio segment, the $2^{nd}$ video segment begins at time 5 seconds and that time 7 seconds and is two seconds long, which corresponds to the $2^{nd}$ audio segment, etc. Each video segment 802 corresponds to a silent audio segment 602 and each video segment 804 corresponds to a non-silent audio segment 604.

Referring again to FIG. 5, a determination is made, at step 504, whether any video segments remain to be processed. If not, processing ends; however, if it is determined, at step 504, that video content segments remain to be processed, processing continues at step 506. In accordance with one or more embodiments, the determination made at step 504 can be based on a determination whether or not each video segment corresponding to an adjusted audio content segment has an adjusted length that matches, e.g., is the same as or equal to, the length of the corresponding adjusted audio content segment.

At step 506, a next video content segment is selected for processing, and a number of frames to be removed from the selected video content segment is determined. By way of a non-limiting example, the $1^{st}$ video content segment shown in FIG. 8, which corresponds to the $1^{st}$ audio content segment shown in FIG. 7, can be selected for adjustment. Assuming a frame rate of 25 fps, the $1^{st}$ video content segment of the video content 206 contains 125 frames, the $2^{nd}$ video content segment contains 50 frames, the $3^{rd}$ video content segment contains 75 frames, etc.

At step 508 of FIG. 5, a delta score is determined for each frame in the selected video content segment. By way of a non-limiting example, a delta score is determined for each of the 125 frames of the $1^{st}$ video content segment selected at step 506. In accordance with one or more embodiments, a frame's delta score represents an amount of difference between the frame and the frames on one or both sides of the frame, e.g., the frames before and after a certain frame. By way of a non-limiting example, the delta score for frame N can be determined based on a measure of the difference between frame N and the previous frame, N−1, and the succeeding frame, N+1.

By way of a non-limiting example, a video content frame encoded in the H.264 format can be an I-frame, or intra-coded frame, which is a fully-specified image, while a P-frame, or predicted picture frame, and a B-frame, or bi-directional frame, are not fully-specified images. A P-frame identifies differences, or changes, in the image from a previous frame, and a B-frame identifies differences between the current frame's image and the preceding and succeeding frames. In accordance with one or more embodiments, a frame with the lowest delta score relative to the delta scores of other frames is selected at step 512. In accordance with one or more embodiments, P-frames and B-frames are preferably selected for removal before an I-frame, since an I-frame typically has the greatest amount of difference associated with it relative to P-frames and B-frames.

By way of a non-limiting example, a frame typically has a data structure, which may be referred to as a motion vector, comprising a number of blocks, each of which is indicative of a change, or difference, between the current frame and one or more contiguous frames. The frame's data structure can be retrieved using FFmpeg™, for example. Embodiments of the present disclosure assign a value to a frame's delta score that is determined by counting the number of changes, e.g., counting the number of blocks in the frame's data structure, or motion vector. The delta score for a P-frame represents the degree of change between the current frame and the previous frame, and the delta score for a B-frame represents the degree of change between the current frame and the previous and succeeding frames.

At step 510, a determination is made whether additional frames are to be removed from the current video segment. Such a determination can be made based on the current length of the video segment and adjusted length of its corresponding audio segment. By way of a non-limiting example, if the current length of the video segment is greater than the adjusted length of its corresponding audio segment, processing continues at step 512 to remove another selected frame from the video segment. Otherwise, e.g., the length of the video segment corresponds to the adjusted length of its corresponding audio segment, processing continues at step 504 to process any remaining video segments.

At step 512, a frame with the highest delta score is selected from the frames that remain in the current video segment. At step 514, the selected frame is removed from the video segment, and the delta scores of the frames positioned before and after the removed frame are adjusted by a factor, or weight, which results in the delta score for each of these frames being increased. By increasing the delta score of each of these frames, the chance of subsequently removing these frames is reduced, so that removal of frames in a continuous region can be avoided. By way of a non-limiting example, a weight, or factor of 1.1 might be used. Processing continues at step 510 to determine whether any additional frames are to be removed from the current video segment.

Figure 9:
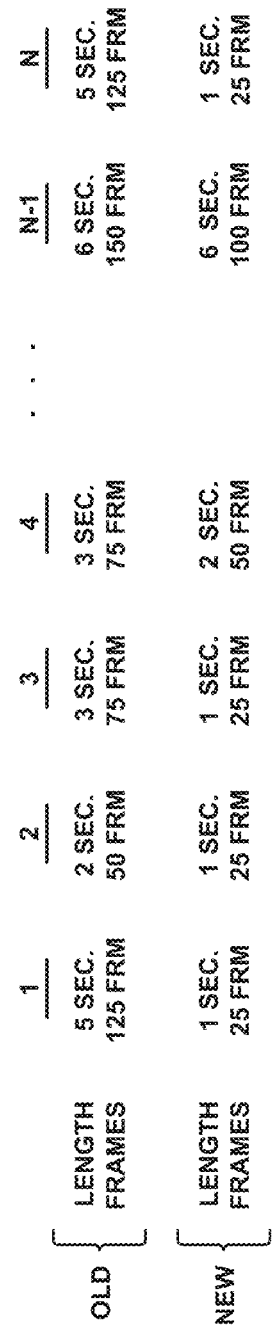

FIG. 9 provides some video content frame removal examples in accordance with one or more embodiments of the present disclosure. In the example shown in FIG. 9, the $1^{st}$ video segment has a current length of 5 seconds, which is to be reduced to 1 second to correspond to the length adjustment made to the corresponding audio segment, e.g., the $1^{st}$ audio segment. The $1^{st}$ video segment has 125 frames and 100 frames, e.g., 4 seconds*25 fps, are removed to reduce the temporal length of the $1^{st}$ video segment from 5 seconds to 1 second.

With reference to FIG. 7, the $3^{rd}$ and $4^{th}$ audio segments have an adjusted, or new, length of 0.6 seconds and 2.25 seconds, respectively, which are not in whole seconds. In order to synchronize the temporal length of each of these audio segments and its corresponding video segment, the audio segment's adjusted length can be rounded, e.g., in accordance with the frame rate. By way of a non-limiting example, the adjusted lengths of the $3^{rd}$ and $4^{th}$ audio segments might be rounded up to nearest second, e.g., from 0.6 seconds to 1 second in the case of the $3^{rd}$ audio segment and rounded down from 2.25 seconds to 2 seconds for the $4^{th}$ audio segment. Alternatively, the adjusted lengths of the $3^{rd}$ and $4^{th}$ audio segments can both be rounded up or both be round down.

Referring again to FIG. 3, the adjusted audio content 304 and the adjusted video content is combined, e.g., encoded, to generate the adjusted media content item 302. The media content item 202 and the adjusted media content item 302 can be in any format and any length. In accordance with one or more embodiments of the present disclosure, the adjusted media content item 302 contains much of the details of the media content item 202 even though the length of the adjusted media content item 302 is reduced from the length of the media content item 202. Furthermore, the adjustment made to the media content item 202 to yield the adjusted media content item 302 avoids introducing unwanted artifacts, such as high-pitched voices.

Embodiments of the present disclosure provide an ability to present content at various playback rates. By way of some non-limiting examples, media content containing audio with less speech might be consumed at a faster playback rate, e.g., 2×, 3× or 4×, while media content with more speech might be consumed at a slower playback rate, e.g., 1.5× or less. Embodiments of the present disclosure can be used to select an appropriate playback rate for a given media content item.

Figure 10:
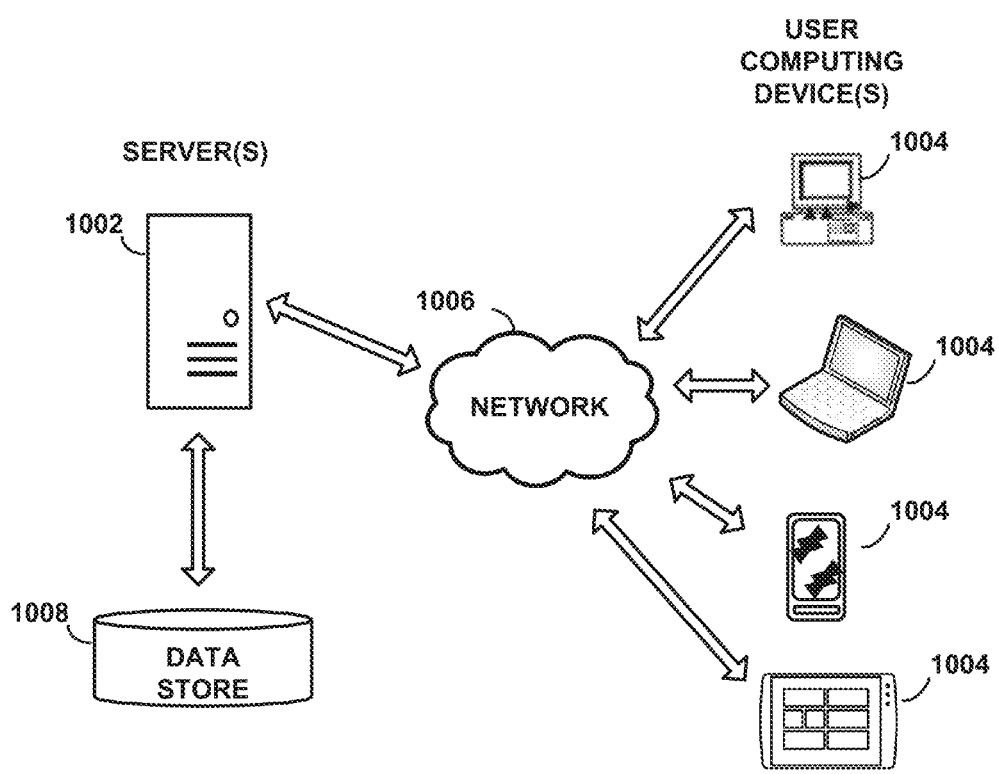
FIG. 10 illustrates some components that can be used in connection with one or more embodiments of the present disclosure.

FIG. 10 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 1002 can be configured to execute program code, instructions, etc. to provide functionality in accordance with one or more embodiments of the present disclosure. The same or another computing device 1002 may be configured to execute program code to implement functionality in accordance with one or more embodiments of the present disclosure.

Computing device 1002 can serve content to user computing devices 1004 using a browser application via a network 1006. Data store 1008 can be used to store program code to configure a server 1002 to functionality in accordance with one or more embodiments of the present disclosure.

The user computing device 1004 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1002 and the user computing device 1004 can include one or more processors, memory, a removable media reader, network interface, display and interface, and one or more input devices, e.g., keyboard, keypad, mouse, etc. and input device interface, for example. One skilled in the art will recognize that server 1002 and user computing device 1004 may be configured in many different ways and implemented using many different combinations of hardware, software, or firmware.

In accordance with one or more embodiments, a computing device 1002 can make a user interface available to a user computing device 1004 via the network 1006. The user interface made available to the user computing device 1004 can include content items, or identifiers (e.g., URLs) selected for the user interface in accordance with one or more embodiments of the present invention. In accordance with one or more embodiments, computing device 1002 makes a user interface available to a user computing device 1004 by communicating a definition of the user interface to the user computing device 1004 via the network 1006. The user interface definition can be specified using any of a number of languages, including without limitation a markup language such as Hypertext Markup Language, scripts, applets and the like. The user interface definition can be processed by an application executing on the user computing device 1004, such as a browser application, to output the user interface on a display coupled, e.g., a display directly or indirectly connected, to the user computing device 1004.

In an embodiment the network 1006 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suite as the Internet. Two of the most important elements in the suite are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 10. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example, however, some networks may employ both as well as other approaches. A P2P network may typically be used for coupling nodes via an ad hoc arrangement or configuration. A peer-to-peer network may employ some nodes capable of operating as both a "client" and a "server."

Figure 11:
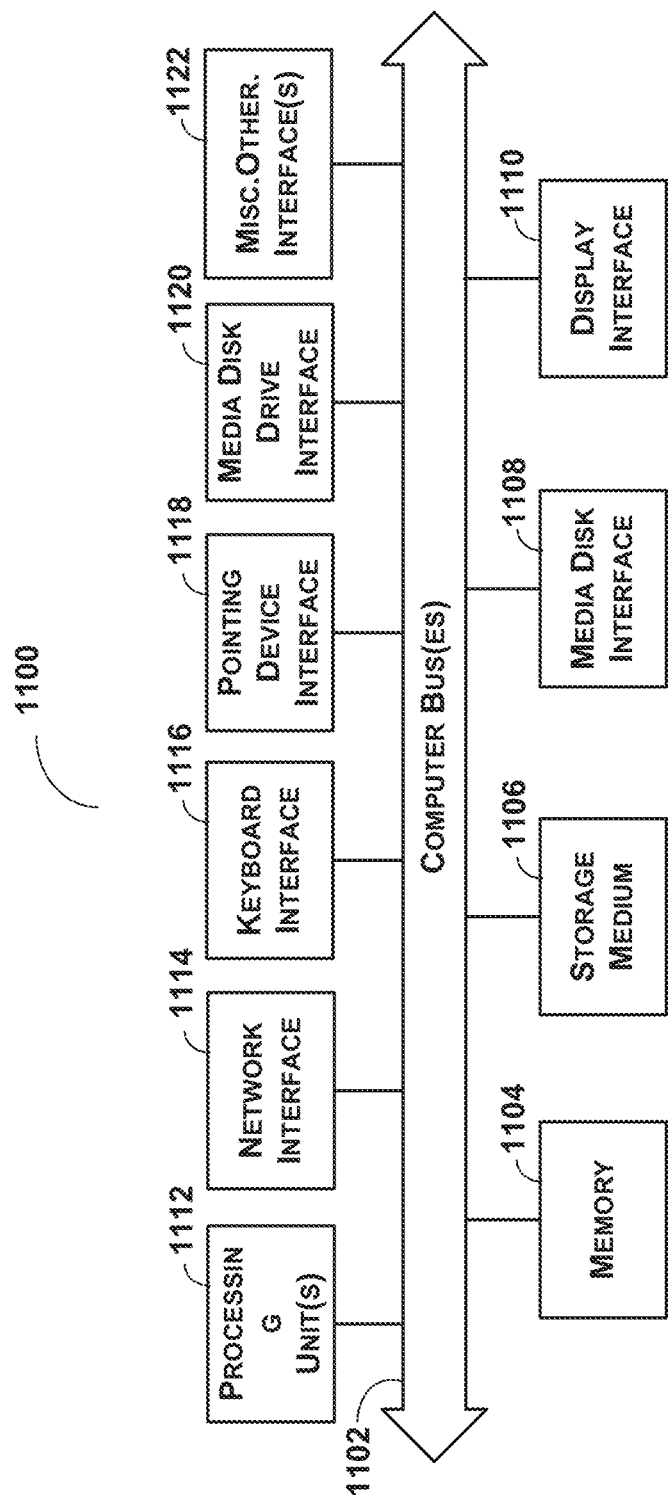
FIG. 11 is a detailed block diagram illustrating an internal architecture of a computing device in accordance with one or more embodiments of the present disclosure.

FIG. 11 is a detailed block diagram illustrating an internal architecture of a computing device, e.g., a computing device such as server 1002 or user computing device 1004, in accordance with one or more embodiments of the present disclosure. As shown in FIG. 11, internal architecture 1100 includes one or more processing units, processors, or processing cores, (also referred to herein as CPUs) 1112, which interface with at least one computer bus 1102. Also interfacing with computer bus 1102 are computer-readable medium, or media, 1106, network interface 1114, memory 1104, e.g., random access memory (RAM), run-time transient memory, read only memory (ROM), etc., media disk drive interface 1120 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, computer-readable storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage, e.g., medium/media 1106, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
modifying, by a computing device, a content item's play length by removing an amount of the content item's audio content and video content, the modifying comprising:
identifying a time allocation score for each of a plurality of audio segments in the audio content, each audio segment's time allocation score being inversely related to its tempo, each audio segment identified as a silent audio segment being assigned a given tempo and each audio segment identified as a non-silent audio segment being assigned a tempo using its audio content;
determining a desired length for each audio segment of a number of audio segments selected from the plurality, the selected audio segments having a higher time allocation score relative to non-selected audio segments of the plurality, the determining comprising using a tempo increase amount in determining the desired length;
removing, for each selected audio segment, some portion of the audio segment's content corresponding to a difference between the audio segment's original length and its desired length;
identifying, for each identified audio segment, a corresponding video segment in the content item; and
adjusting, for each adjusted audio segment, the corresponding content segment by removing a number of frames from the corresponding video segment until the adjusted length of the corresponding video segment matches the selected audio segment's desired length.

2. The method of claim 1, the adjusting the corresponding content segment further comprising:
determining a delta score for each frame of the corresponding segment, a frame's delta score indicative of a level of difference between it and at least one other contiguous frame; and
selecting the number of frames from the corresponding video segment based on the delta score of each frame, such that a frame having a smaller delta score relative to other frames is selected.

3. The method of claim 2, the adjusting the corresponding content segment further comprising:
increasing the delta score of a frame before and a frame after a selected frame.

4. The method of claim 1, removing some portion of the audio segment's content further comprising:
identifying a number of perceptually insignificant portions of the audio segment's content; and
removing the perceptually insignificant portions.

5. The method of claim 1, the content item's playback rate is increased by removing an amount of the content item's audio and video content.

6. The method of claim 1, each audio segment's time allocation score is weighted in accordance with the content item's quality using a weighting selected based on the content item's quality, weighted time allocation scores impacting the amount of audio content and video content removed from the content item such that the weighting used with a high quality content item results in a smaller amount of audio content and video content being removed than a lower quality content item.

7. The method of claim 1, the given tempo used with silent audio segments can be selected based on a quality of the content item.

8. The method of claim 1, the identifying a corresponding video segment further comprising:
identifying the corresponding video segment using a start time and end time of the audio segment.

9. A system comprising:
at least one computing device, each computing device comprising a processor and a storage medium for tangibly storing thereon program logic for execution by the processor, the stored program logic comprising:
modifying logic executed by the processor for modifying a content item's play length by removing an amount of the content item's audio content and video content, the modifying logic comprising:
identifying logic executed by the processor for identifying a time allocation score for each of a plurality of audio segments in the audio content, each audio segment's time allocation score being inversely related to its tempo, each audio segment identified as a silent audio segment being assigned a given tempo and each audio segment identified as a non-silent audio segment being assigned a tempo using its audio content;
determining logic executed by the processor for determining a desired length for each audio segment of a number of audio segments selected from the plurality, the selected audio segments having a higher time allocation score relative to non-selected audio segments of the plurality, the determining comprising using a tempo increase amount in determining the desired length;
removing logic executed by the processor for removing, for each selected audio segment, some portion of the audio segment's content corresponding to a difference between the audio segment's original length and its desired length;
identifying logic executed by the processor for identifying, for each identified audio segment, a corresponding video segment in the content item; and
adjusting logic executed by the processor for adjusting, for each adjusted audio segment, the corresponding content segment by removing a number of frames from the corresponding video segment until the adjusted length of the corresponding video segment matches the selected audio segment's desired length.

10. The system of claim 9, the adjusting logic executed by the processor for adjusting the corresponding content segment further comprising:
determining logic executed by the processor for determining a delta score for each frame of the corresponding segment, a frame's delta score indicative of a level of difference between it and at least one other contiguous frame; and
selecting logic executed by the processor for selecting the number of frames from the corresponding video segment based on the delta score of each frame, such that a frame having a smaller delta score relative to other frames is selected.

11. The system of claim 10, the adjusting logic executed by the processor for adjusting the corresponding content segment further comprising:
increasing logic executed by the processor for increasing the delta score of a frame before and a frame after a selected frame.

12. The system of claim 9, the removing logic executed by the processor for removing some portion of the audio segment's content further comprising:
identifying logic executed by the processor for identifying a number of perceptually insignificant portions of the audio segment's content; and
removing logic executed by the processor for removing the perceptually insignificant portions.

13. The system of claim 9, the content item's playback rate is increased by removing an amount of the content item's audio and video content.

14. The system of claim 9, each audio segment's time allocation score is weighted in accordance with the content item's quality using a weighting selected based on the content item's quality, weighted time allocation scores impacting the amount of audio content and video content removed from the content item such that the weighting used with a high quality content item results in a smaller amount of audio content and video content being removed than a lower quality content item.

15. The system of claim 9, the given tempo used with silent audio segments can be selected based on a quality of the content item.

16. The system of claim 9, the identifying logic executed by the processor for identifying a corresponding video segment further comprising:
identifying logic executed by the processor for identifying the corresponding video segment using a start time and end time of the audio segment.

17. A computer readable non-transitory storage medium for tangibly storing thereon computer readable instructions that when executed cause a processor to:
modify a content item's play length by removing an amount of the content item's audio content and video content, the instructions to modify comprising instructions that when executed cause the processor to:
identify a time allocation score for each of a plurality of audio segments in the audio content, each audio segment's time allocation score being inversely related to its tempo, each audio segment identified as a silent audio segment being assigned a given tempo and each audio segment identified as a non-silent audio segment being assigned a tempo using its audio content;
determine a desired length for each audio segment of a number of audio segments selected from the plurality, the selected audio segments having a higher time allocation score relative to non-selected audio segments of the plurality, the determining comprising using a tempo increase amount in determining the desired length;
remove, for each selected audio segment, some portion of the audio segment's content corresponding to a difference between the audio segment's original length and its desired length;
identify, for each identified audio segment, a corresponding video segment in the content item; and
adjust, for each adjusted audio segment, the corresponding content segment by removing a number of frames from the corresponding video segment until the adjusted length of the corresponding video segment matches the selected audio segment's desired length.

18. The computer readable non-transitory storage medium of claim 17, the instructions that when executed cause the processor to adjust the corresponding content segment further comprising instructions that when executed cause the processor to:
determine a delta score for each frame of the corresponding segment, a frame's delta score indicative of a level of difference between it and at least one other contiguous frame; and
select the number of frames from the corresponding video segment based on the delta score of each frame, such that a frame having a smaller delta score relative to other frames is selected.

19. The computer readable non-transitory storage medium of claim 18, the instructions that when executed cause the processor to adjust the corresponding content segment further comprising instructions that when executed cause the processor to:
increase the delta score of a frame before and a frame after a selected frame.

20. The computer readable non-transitory storage medium of claim 17, instructions that when executed cause the processor to remove some portion of the audio segment's content further comprising instructions that when executed cause the processor to:
identify a number of perceptually insignificant portions of the audio segment's content; and
remove the perceptually insignificant portions.

21. The computer readable non-transitory storage medium of claim 17, the content item's playback rate is increased by removing an amount of the content item's audio and video content.

22. The computer readable non-transitory storage medium of claim 17, each audio segment's time allocation score is weighted in accordance with the content item's quality using a weighting selected based on the content item's quality, weighted time allocation scores impacting the amount of audio content and video content removed from the content item such that the weighting used with a high quality content item results in a smaller amount of audio content and video content being removed than a lower quality content item.

23. The computer readable non-transitory storage medium of claim 17, the given tempo used with silent audio segments can be selected based on a quality of the content item.

24. The computer readable non-transitory storage medium of claim 17, the instructions that when executed cause the processor to identify a corresponding video segment further comprising instructions that when executed cause the processor to:
identify the corresponding video segment using a start time and end time of the audio segment.

* * * * *